(12) United States Patent
Gassmann

(10) Patent No.: US 11,780,315 B2
(45) Date of Patent: Oct. 10, 2023

(54) TRANSMISSION ASSEMBLY FOR A HYBRID VEHICLE

(71) Applicant: GKN Automotive Ltd., Redditch (GB)

(72) Inventor: Theodor Gassmann, Siegburg (DE)

(73) Assignee: GKN Automotive Ltd., Redditch (GB)

( * ) Notice: Subject to any disclaimer, the term of this patent is extended or adjusted under 35 U.S.C. 154(b) by 138 days.

(21) Appl. No.: 16/624,328

(22) PCT Filed: Jun. 29, 2017

(86) PCT No.: PCT/EP2017/066084
§ 371 (c)(1),
(2) Date: Dec. 19, 2019

(87) PCT Pub. No.: WO2019/001708
PCT Pub. Date: Jan. 3, 2019

(65) Prior Publication Data
US 2021/0146767 A1    May 20, 2021

(51) Int. Cl.
*B60K 6/365* (2007.10)
*F16H 3/62* (2006.01)
(Continued)

(52) U.S. Cl.
CPC .............. *B60K 6/365* (2013.01); *B60K 6/26* (2013.01); *B60K 6/387* (2013.01); *B60K 6/48* (2013.01);
(Continued)

(58) Field of Classification Search
CPC .................... B60K 6/20–6/547; F16H 2200/2041–2200/2061;
(Continued)

(56) References Cited

U.S. PATENT DOCUMENTS

| 5,789,823 A * | 8/1998 | Sherman | F16H 61/62 290/46 |
| 8,303,447 B1 * | 11/2012 | Kim | B60L 50/61 475/284 |

(Continued)

FOREIGN PATENT DOCUMENTS

| CN | 202656855 U | 1/2013 |
| CN | 104093586 A | 10/2014 |

(Continued)

OTHER PUBLICATIONS

JPO Notification of Reasons for Rejection dated Dec. 15, 2020 for Application No. JP2020-500207 (11 pages; with English translation).

(Continued)

*Primary Examiner* — Ernesto A Suarez
*Assistant Examiner* — Lillian T Nguyen
(74) *Attorney, Agent, or Firm* — Bejin Bieneman PLC

(57) ABSTRACT

A transmission assembly for a hybrid vehicle includes an internal combustion engine and an electric machine, wherein a first drive torque of the internal combustion engine and a second drive torque of the electric machine are transferable to a drive shaft of the hybrid vehicle via the transmission assembly, wherein the transmission assembly comprises:
  a first transmission input shaft, via which the first drive torque 1 of the internal combustion engine is introduced into the transmission assembly;
  a second transmission input shaft, via which the second drive torque of the electric machine is introduced into the transmission assembly;
  the drive shaft; and
  at least a first planetary transmission including a first ring gear, a first planetary carrier and a first sun gear;
(Continued)

wherein the first transmission input shaft is connected via the first planetary transmission to the second transmission input shaft and to the drive shaft.

8 Claims, 5 Drawing Sheets

(51) Int. Cl.
*B60K 6/26* (2007.10)
*B60K 6/387* (2007.10)
*B60K 6/48* (2007.10)
*B60K 6/547* (2007.10)
*F16H 1/28* (2006.01)

(52) U.S. Cl.
CPC .............. *B60K 6/547* (2013.01); *F16H 1/28* (2013.01); *F16H 3/62* (2013.01); *B60K 2006/268* (2013.01); *B60K 2006/4825* (2013.01); *B60Y 2200/92* (2013.01); *B60Y 2400/46* (2013.01); *F16H 2200/0034* (2013.01); *F16H 2200/2007* (2013.01); *F16H 2200/2035* (2013.01)

(58) Field of Classification Search
CPC ...... F16H 3/724–725; F16H 2200/2005–2028; F16H 3/46–60
See application file for complete search history.

(56) References Cited

U.S. PATENT DOCUMENTS

| | | | |
|---|---|---|---|
| 8,556,769 B1* | 10/2013 | Gv | F16H 3/728 475/5 |
| 11,440,530 B2* | 9/2022 | Shimura | B60K 6/543 |
| 2002/0107101 A1 | 8/2002 | Bowen et al. | |
| 2009/0124451 A1* | 5/2009 | Rask | B60K 6/365 477/3 |
| 2014/0136040 A1 | 5/2014 | Scholz et al. | |
| 2014/0244088 A1* | 8/2014 | Kim | B60K 6/445 180/65.265 |
| 2015/0167806 A1* | 6/2015 | Lee | F16H 61/0403 180/65.23 |
| 2015/0352942 A1 | 12/2015 | Kaltenbach et al. | |
| 2016/0167639 A1* | 6/2016 | Hori | B60L 50/51 903/906 |
| 2016/0368361 A1* | 12/2016 | Endo | F16H 1/46 |
| 2016/0375756 A1* | 12/2016 | Choi | F16H 3/728 475/5 |
| 2018/0304896 A1* | 10/2018 | Katsura | B60W 20/10 |
| 2019/0126735 A1* | 5/2019 | Hwang | B60K 6/365 |

FOREIGN PATENT DOCUMENTS

| | | |
|---|---|---|
| CN | 204055309 U | 12/2014 |
| CN | 104442803 A | 3/2015 |
| CN | 104797447 A | 7/2015 |
| CN | 105276105 A | 1/2016 |
| CN | 106438880 A | 2/2017 |
| DE | 10002133 A1 | 8/2000 |
| DE | 102012220827 A1 | 5/2014 |
| DE | 102013206176 A1 | 10/2014 |
| DE | 102014118448 A1 | 1/2016 |
| EP | 2810806 A1 | 12/2014 |
| EP | 2862770 A1 | 4/2015 |
| JP | 2000219055 A | 8/2000 |
| JP | 2001164596 A | 6/2001 |
| JP | 2006022790 A | 1/2006 |
| JP | 2006168480 A | 6/2006 |
| JP | 2009241830 A | 10/2009 |
| JP | 2009257574 A | 11/2009 |
| JP | 2010241390 A | 10/2010 |
| JP | 2012183879 A | 9/2012 |
| JP | 2013103654 A | 5/2013 |
| KR | 10-2017-0070581 A | 6/2017 |
| WO | 2013114595 A1 | 8/2013 |
| WO | 2014086680 A1 | 6/2014 |

OTHER PUBLICATIONS

First Office Action dated Nov. 3, 2021 from National Intellectual Property Administration, P.R. China regarding Patent Application No. 201780092688.2 (English translation) (15 pages).
JPO Office Action dated Aug. 31, 2021 for Application No. JP2020-500207 (13 pages; with English machine translation).
International Search Report and Written Opinion for PCT/EP2017/066084 dated Mar. 1, 2018 (11 pages; with English translation).
JPO Office Action for related Application No. JP2020-500207 dated Apr. 19, 2022 (12 pages; with English machine translation).
Chinese Office Action dated May 7, 2022 for related application No. CN201780092688.2 (22 pages; with English translation).
Third Chinese Office Action for related application No. CN2017800926882 (7 pages; English translation only).

* cited by examiner

ABSTRACT
TRANSMISSION ASSEMBLY FOR A HYBRID VEHICLE

CROSS-REFERENCE TO RELATED APPLICATIONS

This application is a national stage of, and claims priority to, Patent Cooperation Treaty Application No. PCT/EP2017/066084, filed on Jun. 29, 2017, which application is hereby incorporated herein by reference in its entirety.

BACKGROUND

Transmission assemblies for hybrid vehicles having an internal combustion engine and a (single) electric machine are known. These transmission assemblies, which are of simple construction, do not comprise a power-shift transmission, so that a drive torque of the internal combustion engine is transferred to a drive shaft by a single, constant transmission. A disadvantage of such a transmission assembly is, however, that the internal combustion engine, because of the constant transmission, can only be connected in to the drive shaft above a certain speed of the hybrid vehicle (e.g., above a speed of 50 kilometers per hour). Until that speed is reached, a purely electrical driving mode is necessary. The first electric machine must be designed to be correspondingly powerful.

SUMMARY

The present disclosure is related to a transmission assembly for a hybrid vehicle having an internal combustion engine and an electric machine. The electric machine can serve both to drive the hybrid vehicle and to start the internal combustion engine. Furthermore, it can be driven by the internal combustion engine and thus operated as a generator for converting kinetic energy into electrical energy. The transmission assembly serves to selectively transfer a drive torque of at least the electric machine and/or the internal combustion engine to at least one drive shaft of the hybrid vehicle. The drive shaft of the hybrid vehicle is arranged between the transmission assembly and the wheels of the hybrid vehicle.

Starting therefrom, the present disclosure describes a transmission assembly for a hybrid vehicle which makes it possible to start the hybrid vehicle also using the internal combustion engine. An electric machine with lower power could thus be used for the hybrid vehicle.

A transmission assembly according to the features of the independent claims contributes to this end. Advantageous further developments are provided in the dependent patent claims. The features listed individually in the patent claims can be combined with one another in a technologically expedient manner and can be supplemented by explanatory facts from the description and details from the figures, wherein further examples of the disclosure are indicated.

There is disclosed herein a transmission assembly for a hybrid vehicle having an internal combustion engine and an electric machine, wherein a first drive torque of the internal combustion engine and a second drive torque of the electric machine can be transferred to a drive shaft of the hybrid vehicle via the transmission assembly, wherein the transmission assembly comprises at least the following components:

(1) a first transmission input shaft, via which the first drive torque of the internal combustion engine can be introduced into the transmission assembly;
(2) a second transmission input shaft, via which the second drive torque of the electric machine can be introduced into the transmission assembly;
(3) the drive shaft; and
(4) at least a first planetary transmission having at least the components first ring gear, first planetary carrier and first sun gear;

wherein the first transmission input shaft is connected via the first planetary transmission to the second transmission input shaft and to the drive shaft. Connected means in this context that a rotation of the first transmission input shaft causes a rotation of at least one component of the planetary transmission. All of the following operating modes are made possible by the transmission assembly:

a. driving of the drive shaft solely via the second drive torque;
b. driving of the drive shaft via the first drive torque and the second drive torque, wherein the first transmission input shaft and the second transmission input shaft are connected together via a constant transmission;
c. driving of the drive shaft via (only) the first drive torque or (only) the second drive torque, wherein the drive torque (that is to say the first drive torque and the second drive torque) can be transferred (to the drive shaft) via a constant first transmission and (at least the first drive torque) additionally via a constant second transmission.

The following operating mode is additionally possible:

d. driving of the drive shaft via the first drive torque and the second drive torque, wherein the first transmission input shaft and the second transmission input shaft are connected together via a variable transmission;

The following operating mode is additionally possible (alternatively or in addition to d.):

e. driving of the first transmission input shaft via the second transmission input shaft for starting an internal combustion engine.

The transmission assembly can include a first clutch, wherein the first clutch connects the first transmission input shaft to the second transmission input shaft and additionally the first transmission input shaft or the second transmission input shaft to a component of the first planetary transmission in an engageable/disengageable manner via a constant transmission.

According to a first example, the second transmission input shaft is connected to the first planetary transmission via the first ring gear in a permanently rotationally fixed manner by a constant transmission. In a permanently rotationally fixed manner here means that a clutch is not provided between the second transmission input shaft and the first ring gear. A rotation of the second transmission input shaft will thus always bring about a rotation of the first ring gear. The first clutch can connect the first transmission input shaft to the first planetary transmission via the first ring gear, so that the first transmission input shaft can be connected to the second transmission input shaft in a rotationally fixed but here engageable/disengageable manner.

The first transmission input shaft is connected to the first sun gear in a rotationally fixed manner (and without a clutch). If the second transmission input shaft is thereby connected to the first planetary transmission via the first ring gear, the first planetary transmission can be locked via the first clutch. A second clutch can be provided, via which the first transmission input shaft can be connected in an engageable/disengageable manner to a crankshaft of the internal combustion engine.

According to a second example, the second transmission input shaft is connected to the first planetary transmission via the first sun gear in a rotationally fixed manner, e.g., a permanently rotationally fixed manner, by a constant transmission. In a permanently rotationally fixed manner here means that a clutch is not provided between the second transmission input shaft and the first sun gear. The first clutch connects the first transmission input shaft to the first planetary transmission via the first sun gear, so that the first transmission input shaft can be connected to the second transmission input shaft in a rotationally fixed but here engageable/disengageable manner.

The transmission assembly can further include a second clutch, wherein the second clutch is provided for connecting a crankshaft of the internal combustion engine to the first planetary transmission in an engageable/disengageable manner via a constant transmission. The second clutch can also can be arranged outside a housing of the transmission assembly. The first transmission input shaft can then be connected to the crankshaft of the internal combustion engine in an engageable/disengageable manner via the second clutch.

In an example, the transmission assembly comprises a second planetary transmission having at least the components second ring gear, second planetary carrier and second sun gear, wherein the first planetary transmission is connected via the second planetary transmission to the drive shaft.

The second planetary transmission forms the so-called change-speed gear, so that the first drive torque and/or the second drive torque can be transferred to the drive shaft at least via two possible transmissions, which are provided by the second planetary transmission.

The transmission assembly can further include a third clutch, wherein the third clutch connects two components of the second planetary transmission together in an engageable/disengageable manner, and thus the second planetary transmission can be locked. As a result of the locking of the second planetary transmission, all the components of the second planetary transmission (that is to say the second ring gear, the second planetary carrier and the second sun gear) rotate with a common rotational speed. A second transmission is thereby provided.

The transmission assembly can further include a fourth clutch, wherein the fourth clutch connects one of the components of the second planetary transmission to a housing of the transmission assembly in an engageable/disengageable manner. The rotational speed of that one component can thus be reduced to zero. The torque (the first torque and/or the second torque) introduced into the second planetary transmission via the first planetary transmission is then transferred to the drive shaft via the components (not fixed to the housing) of the second planetary transmission.

In an example, the transmission assembly comprises a second transmission system, wherein the second transmission system provides the two possible transmissions. A drive torque (the first drive torque and/or the second drive torque) can thus be transferred via the first planetary transmission to the second transmission system and via the second transmission system to the drive shaft. The second transmission system can include a first transmission, which can be connected via a third clutch to the drive shaft, and a second transmission, which can be connected via the fourth clutch to the drive shaft. In the case of the first transmission, the drive torque is transferred to the drive shaft starting from a component of the first planetary transmission (e.g. from the first planetary carrier) via the second transmission system. In the case of the second transmission, the drive torque is transferred to the drive shaft starting from another component of the first planetary transmission (e.g. from the first ring gear) via the second transmission system.

In an example, the transmission assembly comprises the first planetary transmission as the only planetary transmission (and as the only transmission system).

The transmission assembly (which can include only a single transmission system, namely the first planetary transmission) comprises a first clutch and a fifth clutch, wherein the first clutch connects the first transmission input shaft to the second transmission input shaft and additionally the first transmission input shaft to a component of the first planetary transmission in an engageable/disengageable manner via a constant transmission, wherein the fifth clutch connects the first transmission input shaft to another component of the first planetary transmission via a constant transmission.

The first clutch can connect the first transmission input shaft to the second transmission input shaft and to the first sun gear. The fifth clutch can connect the first transmission input shaft to the first ring gear.

Alternatively to the form with the fifth clutch, the transmission assembly (which can include only a single transmission system, namely the first planetary transmission) comprises a first clutch and a sixth clutch, wherein the first clutch connects the first transmission input shaft to the second input shaft and additionally the first transmission input shaft to a component of the first planetary transmission in an engageable/disengageable manner via a constant transmission, wherein the sixth clutch connects the second transmission input shaft to another component of the first planetary transmission via a constant transmission.

In an example, the transmission assembly can further include a seventh clutch, wherein the seventh clutch connects a component of the first planetary transmission to a housing of the transmission assembly in an engageable/disengageable manner.

The drive shaft can be connected via the first planetary carrier to the first planetary transmission.

There is further disclosed herein a hybrid vehicle having an internal combustion engine and an electric machine and also having a transmission assembly as described hereinbefore, wherein a first drive torque of the internal combustion engine and a second drive torque of the electric machine can be transferred to a drive shaft of the hybrid vehicle via the transmission assembly. It is disclosed herein that the transmission assembly or the hybrid vehicle comprises a second clutch which connects a crankshaft of the internal combustion engine to the first planetary transmission in an engageable/disengageable manner via a constant transmission. The second clutch can also be associated with the internal combustion engine and thus arranged outside a housing of the transmission assembly. The first transmission input shaft is then connected in an engageable/disengageable manner via the second clutch to the crankshaft.

The remarks made in connection with the gear assembly apply equally to the hybrid vehicle and vice versa.

The electric machine can be used on the one hand for providing a second drive torque for the drive shaft. On the other hand, it can also be operated via the internal combustion engine as a generator and thus be used for charging an electrical storage device.

The electric machine serves also for starting the internal combustion engine.

The first planetary transmission or the second planetary transmission comprises at least a ring gear, a planetary carrier and a sun gear. Between the ring gear and the sun gear there can be arranged in known manner a plurality of planetary gears, which are rotatably arranged on the planetary carrier.

Two components can be connected together in a friction-based or form-locking manner via the clutches. Form-locking connections are formed by the interengagement of at least two connection partners. The connection partners can thereby not be detached from one another even without or with interrupted force transmission. In other words, in a form-locking connection, one connection partner is in the way of the other. A form-locking connection of two components is produced, for example, via a clutch in the form of a dog clutch. Friction-based (or also force-based) connections require a normal force on the surfaces to be connected together. Their mutual displacement is prevented as long as the counter-force provided by the adhesive friction is not exceeded. A friction-based connection of two components is produced, for example, via a clutch in the form of a friction clutch. The clutches are not limited to a specific form of a clutch.

According to an example, the drive shaft is a housing of a differential, wherein the differential comprises a first output shaft and a second output shaft which can be driven via the housing. The first output shaft and the second output shaft can be constituent parts of an axle of the hybrid vehicle, wherein a wheel of the hybrid vehicle can be driven via each of the output shafts.

The transmission assembly represents a multimode transmission capable of recuperation, which can be operated by various operating methods. The drive shaft is thereby driven with a (optionally summed) drive torque (that is to say the first drive torque and/or the second drive torque).

In an electromotive operating method (EM; the drive torque of the drive shaft corresponds to the second drive torque), the drive shaft is driven solely via the electric machine. The first drive torque is, e.g., zero, the internal combustion engine is thus not operated. The internal combustion engine having the crankshaft and the first transmission input shaft can thereby be uncoupled from the first planetary transmission.

In a parallel hybrid operating method (PM; the drive torque of the drive shaft is composed of the first drive torque and the second drive torque), the drive shaft is driven by the electric machine and the internal combustion engine.

In the case of the PM operating method there is present on the one hand a CVT (continuously variable transmission) operating method (CVTM; the internal combustion engine and the electric machine are connected together via a variable transmission; the internal combustion engine provides first drive torque for the drive shaft; the electric machine provides second drive torque for the drive shaft; the electric machine is optionally likewise operated as a generator), in which the drive shaft is driven by the electric machine and the internal combustion engine, wherein a rotational speed difference between the internal combustion engine and the electric machine can be compensated via the power input/output of the electric machine, which can also be operated as a generator. In the CVT operating method, a rotational speed of the drive shaft can thus be changed by the operation of the electric machine (direction of rotation, rotational speed, second drive torque). As a result, in a specific rotational speed range of the drive shaft, the internal combustion engine can be operated at an operating point which is optimal (for consumption), wherein the required rotational speed and optionally the drive torque additionally required to achieve the required drive torque of the drive shaft (or for reduction) is provided by the electric machine as second drive torque.

In the CVT operating method, an electrical storage device, for example a storage device of the hybrid vehicle, can be charged during driving operation of the hybrid vehicle via the electric machine operated as a generator. In the CVT operating method, the internal combustion engine is supported in low and medium speed ranges by the electric machine and operates the electric machine as a generator. At higher speeds, the electric machine is fed from the storage device of the hybrid vehicle and supports the internal combustion engine in that the first drive torque and the second drive torque are added together to form the drive torque of the drive shaft.

On the other hand, in the PM operating method there is present a direct drive operating method (DM; the internal combustion engine and the electric machine are connected together via a constant transmission; the first electric machine is driven, as required, via the internal combustion engine as a generator; the internal combustion engine provides a first drive torque, optionally minus or plus the second drive torque, for the drive shaft), in which the drive shaft is driven by the internal combustion engine and optionally additionally by the electric machine. A second drive torque can optionally be diverted from the first drive torque of the internal combustion engine via the electric machine. The internal combustion engine and the electric machine are connected together via a constant transmission.

In an electric starting operating method (eStart; the drive torque of the drive shaft corresponds to the first drive torque), the internal combustion engine is driven and started by the electric machine. The electric machine, the internal combustion engine and the first transmission input shaft are thereby uncoupled from the drive shaft.

Where numerals ("first", "second", "third", etc.) are used in the description, they serve (unless explicitly indicated otherwise) merely for distinction and do not indicate a sequence or mutual dependence.

SUMMARY OF THE DRAWINGS

The disclosure and the technical context will be explained in greater detail hereinbelow with reference to the figures. It should be pointed out that the disclosure is not to be limited by the exemplary embodiments shown. It is also possible, unless explicitly indicated otherwise, to extract partial aspects of the facts explained in the figures and combine them with other constituent parts and findings from the present description and/or figures. The same reference numerals denote the same objects, so that explanations from other figures can additionally be used where appropriate. In the schematic figures.

DESCRIPTION

Figure 1:
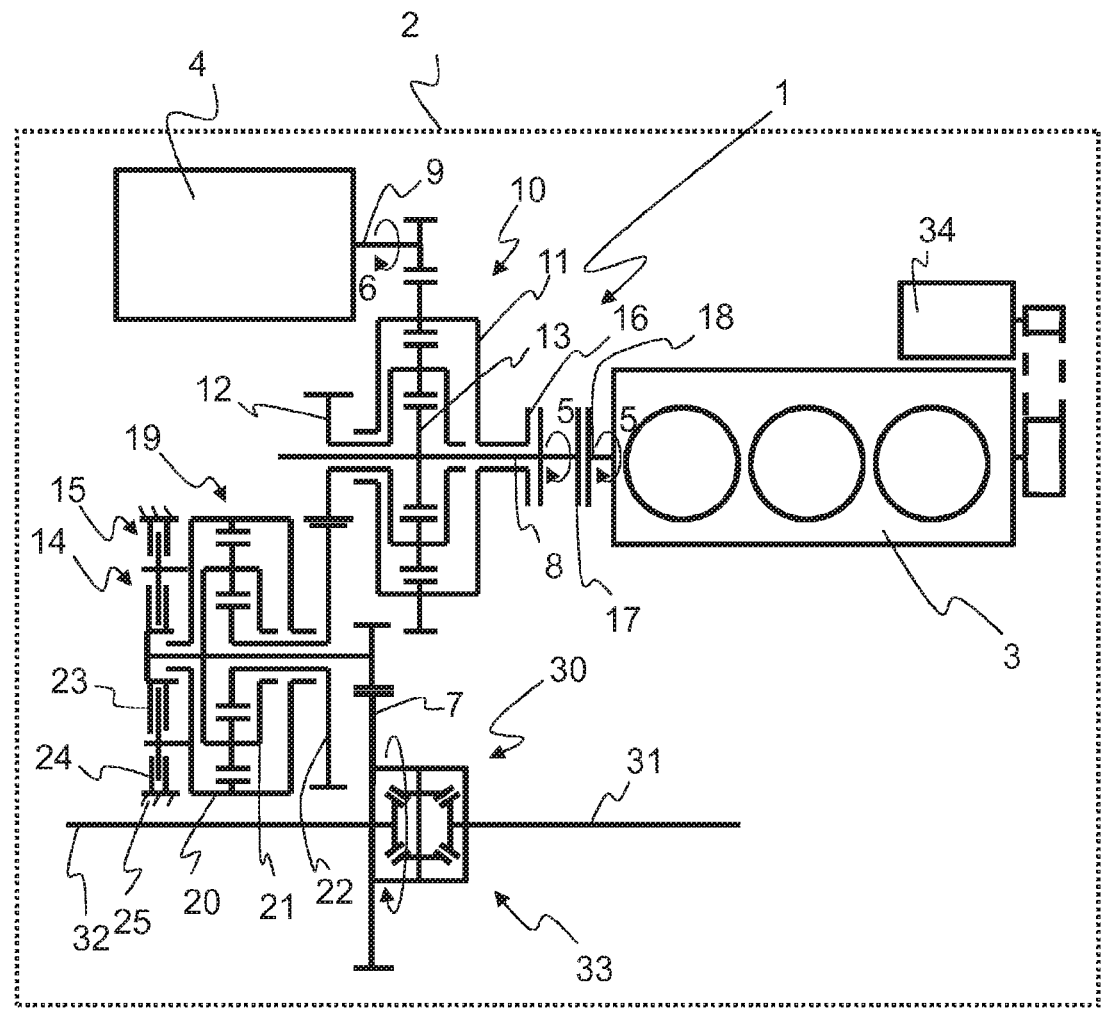
FIG. 1 illustrates a hybrid vehicle having a transmission assembly according to a first example.

FIG. 1 shows a hybrid vehicle 2 having a transmission assembly 1 according to a first example. The hybrid vehicle 2 comprises an internal combustion engine 3, an electric machine 4, a generator 34, which is connected to the internal combustion engine in a permanently rotationally fixed manner (that is to say without a clutch), and a transmission assembly 1. Via the transmission assembly 1, a first drive torque 5 of the internal combustion engine 3 and a second drive torque 6 of the electric machine 4 can be transferred to a drive shaft 7 of the hybrid vehicle 2. The transmission assembly 1 comprises at least the following components: a first transmission input shaft 8, via which the first drive torque 5 of the internal combustion engine 3 can be introduced into the transmission assembly 1; a second transmission input shaft 9, via which the second drive torque 6 of the electric machine 4 can be introduced into the transmission assembly 1; the drive shaft 7; and a first planetary transmission 10 having the components first ring gear 11, first planetary carrier 12 and first sun gear 13. The first transmission input shaft 8 is connected via the first planetary transmission 10 to the second transmission input shaft 9 and to the drive shaft 7. Connected means in this context that a rotation of the first transmission input shaft 8 brings about a rotation of at least one component of the planetary transmission 10, here of the first ring gear 11. By means of the transmission assembly 1, all of the following operating modes are made possible:

a. driving of the drive shaft 7 solely via the second drive torque 6;
b. driving of the drive shaft 7 via the first drive torque 5 and the second drive torque 6, wherein the first transmission input shaft 8 and the second transmission input shaft 9 are connected together via a constant transmission;
c. driving of the drive shaft 7 via (only) the first drive torque 5 or (only) the second drive torque 6, wherein the drive torque (that is to say the first drive torque 5 and the second drive torque 6) can be transferred to the drive shaft 7 via a constant first transmission 14 and additionally via a constant second transmission 15;
d. driving of the drive shaft 7 via the first drive torque 5 and the second drive torque 6, wherein the first transmission input shaft 8 and the second transmission input shaft 9 are connected together via a variable transmission;
e. driving of the first transmission input shaft 8 via the second transmission input shaft 9 for starting an internal combustion engine 3.

The transmission assembly 1 comprises a first clutch 16, wherein the first clutch 16 connects the first transmission input shaft 8 to the second transmission input shaft 9 and additionally the first transmission input shaft 8 to the first ring gear 11 of the first planetary transmission 10 in an engageable/disengageable manner via a constant transmission.

According to the above-mentioned first example, the second transmission input shaft 9 is here connected in a permanently rotationally fixed manner to the first planetary transmission 10 via the first ring gear 11 by a constant transmission. Furthermore, the first clutch 16 connects the first transmission input shaft 8 via the first ring gear 11 to the first planetary transmission 10, so that the first transmission input shaft 8 can be connected to the second transmission input shaft 9 in a rotationally fixed but engageable/disengageable manner.

The first transmission input shaft 8 is connected in a rotationally fixed manner (and without a clutch) to the first sun gear 13. Because the second transmission input shaft 9 is thereby connected to the first planetary transmission 10 via the first ring gear 11, the first planetary transmission 10 can be locked via the first clutch 16.

A second clutch 17 is further provided here, via which the first transmission input shaft 8 is connected in an engageable/disengageable manner to a crankshaft 18 of the internal combustion engine 3.

The transmission assembly 1 additionally comprises a second planetary transmission 19 having at least the components second ring gear 20, second planetary carrier 21 and second sun gear 22, wherein the first planetary transmission 10 is connected to the drive shaft 7 via the second planetary transmission 19. The second planetary transmission 19 here forms the so-called change-speed gear, so that the first drive torque 5 and/or the second drive torque 6 can be transferred to the drive shaft 7 via two possible transmissions 14, 15, which are provided by the second planetary transmission 19.

To that end, the transmission assembly 1 comprises a third clutch 23, wherein the third clutch 23 connects two components (here the second planetary carrier 21 and the second ring gear 20) of the second planetary transmission 19 together in an engageable/disengageable manner, and the second planetary transmission 19 can thus be locked. As a result of the locking of the second planetary transmission 19, all the components of the second planetary transmission 19 (that is to say the second ring gear 20, the second planetary carrier 21 and the second sun gear 22) rotate with a common rotational speed. A second transmission 15 is thereby provided.

The transmission assembly 1 further comprises a fourth clutch 24, wherein the fourth clutch 24 connects one of the components (here the second ring gear 20) of the second planetary transmission 19 to a housing 25 of the transmission assembly 1 in an engageable/disengageable manner. The rotational speed of the second ring gear 20 can thus be reduced to zero. The drive torque (the first drive torque 5 and/or the second drive torque 6) introduced into the second planetary transmission 19 via the first planetary transmission 10 is then transferred to the drive shaft 7 via the components 21, 22 (not fixed to the housing 25) of the second planetary transmission 19.

The drive shaft 7 is a housing of a differential 30, wherein the differential 30 comprises a first output shaft 31 and a second output shaft 32 which can be driven via the housing. The first output shaft 31 and the second output shaft 32 are constituent parts of an axle 33 of the hybrid vehicle 2, wherein a wheel of the hybrid vehicle 2 can be driven via each of the output shafts 31, 32.

In an electromotive operating method (EM; the drive torque of the drive shaft 7 corresponds to the second drive torque 6), the drive shaft 7 is driven solely via the electric machine 4. The first drive torque 5 is, e.g., zero, the internal combustion engine 3 is thus not operated. The internal combustion engine 3 and the first transmission input shaft 8 are thereby uncoupled from the electric machine 4 via the unactuated second clutch 17.

This can be achieved here by closing the first clutch 16 and opening the second clutch 17. By correspondingly engaging/disengaging the third clutch 23 and the fourth clutch 24, the second drive torque 6 can be transferred to the drive shaft 7 by the first transmission 14 or the second transmission 15 of the second planetary transmission 19.

In a series hybrid operating method (SM; the drive torque of the drive shaft 7 corresponds to the second drive torque 6), the drive shaft 7 is driven solely via the electric machine 4. Furthermore, the generator 34 is operated via the internal combustion engine 3. The internal combustion engine 3 and the first transmission input shaft 8 are thereby uncoupled from the first planetary transmission 10 and the electric machine 4 via the unactuated second clutch 17.

In a parallel hybrid operating method (PM; the drive torque of the drive shaft 7 is composed of the first drive torque 5 and the second drive torque 6), the drive shaft 7 is driven by the electric machine 4 and the internal combustion engine 3.

In the case of the PM operating method, there is present on the one hand a CVT (continuously variable transmission) operating method (CVTM1 and CVTM2; the internal combustion engine 3 and the first electric machine 4 are connected together via a variable transmission of the first planetary transmission 10; the first electric machine 4 provides a second drive torque 6 for the drive shaft 7; the internal combustion engine 3 provides a first drive torque 5, plus or minus the second drive torque 6, for the drive shaft 7; the electric machine 4 is optionally likewise operated as a generator), in which the drive shaft 7 is driven by the electric machine 4 and the internal combustion engine 3, wherein a rotational speed difference between the internal combustion engine 3 and the electric machine 4 can be compensated via the power input/output of the electric machine 4, which can also be operated as a generator. In the CVT operating method, a rotational speed of the drive shaft 7 can thus be changed by the operation of the electric machine 4 (direction of rotation, rotational speed, second drive torque 6). As a result, in a specific rotational speed range of the drive shaft 7, the internal combustion engine 3 can be operated at an operating point which is optimal (for consumption), wherein the required rotational speed and optionally the drive torque additionally required to achieve the required drive torque of the drive shaft 7 (or for reduction) is provided by the electric machine 4 as the second drive torque 6.

In the CVT operating method, an electrical storage device, for example a storage device of the hybrid vehicle 2, can be charged during driving operation of the hybrid vehicle 2 via the electric machine 4 operated as a generator. In the CVT operating method, the internal combustion engine 3 is supported by the electric machine 4 in low and medium speed ranges and optionally additionally operates the generator 34. At higher speeds, the electric machine 4 is then fed from the storage device of the hybrid vehicle 2 and supports the internal combustion engine 3 in that the first drive torque 5 and the second drive torque 6 are added together to form the drive torque of the drive shaft 7.

The CVT operating method can be achieved by opening the first clutch 16 and by closing the second clutch 17. By correspondingly engaging/disengaging the third clutch 23 and the fourth clutch 24, the second drive torque 6 can be transferred to the drive shaft 7 by the first transmission 14 (CVTM1) or the second transmission 15 (CVTM2) of the second planetary transmission 19.

On the other hand, there is present in the case of the PM operating method a direct drive operating method (DM; the internal combustion engine 3 and the electric machine 4 are connected together via a constant transmission; the electric machine 4 is driven as a generator, as required, via the internal combustion engine 3; the internal combustion engine 3 provides a first drive torque 5, optionally minus or plus the second drive torque 6, for the drive shaft 7), in which the drive shaft 7 is driven by the internal combustion engine 3 and optionally additionally by the electric machine 4. Optionally, a second drive torque 6 can be diverted from the first drive torque 5 of the internal combustion engine 3 via the electric machine 4. The internal combustion engine 3 and the electric machine 4 are connected together via a constant transmission. The constant transmission is achieved by the closed first clutch 16 and the closed second clutch 17.

In an electric starting operating method (eStart; the first drive torque 5 corresponds to the second drive torque 6), the internal combustion engine 3 is driven and started by the electric machine 4. The internal combustion engine 3 and the first transmission input shaft 8 are thereby coupled with the second transmission input shaft 9 via the actuated first clutch 16 and the actuated second clutch 17. The drive shaft 7 is uncoupled from the drive shaft 7 via the unactuated third clutch 23 and the unactuated fourth clutch 24.

In a tow-start operating method (tow-start; driving of the drive shaft 7 via the second drive torque 6, starting of the internal combustion engine 3 by the electric machine 4), the internal combustion engine 3 is started via the electric machine 4 with the drive shaft 7 being driven. To that end, part of the second drive torque 6 is diverted to the crankshaft 18 of the internal combustion engine 3, while the drive shaft 7 continues to be driven via the residual torque of the second drive torque 6. To that end, with the first clutch 16 actuated, the second clutch 17 is closed in a controlled manner.

The engaged/disengaged states of the individual clutches 16, 17, 23, 24 for the respective operating method are indicated hereinbelow for this first example of the transmission assembly 1:

| Operating method | | 1st clutch | 2nd clutch | 3rd clutch | 4th clutch | VM | EM |
|---|---|---|---|---|---|---|---|
| CVTM1 | | ○ | X | ○ | X | X | X |
| 1st gear | DM | X | X | ○ | X | X | X |
| | EM | X | ○ | ○ | X | ○ | X |
| CVTM2 | | ○ | X | X | ○ | X | X |
| 2nd gear | DM | X | X | X | ○ | X | X |
| | EM | X | ○ | X | ○ | ○ | X |
| Tow-start | | | | Possible in both gears | | | |
| eStart | | X | X | ○ | ○ | ○ | X |

CVTM1: CVT operating method with transfer of drive torque via 1st gear
CVTM2: CVT operating method with transfer of drive torque via 2nd gear
EM: electromotive operating method
DM: direct drive operating method
1st clutch: engaged/disengaged state of the first clutch
2nd clutch: engaged/disengaged state of the second clutch
3rd clutch: engaged/disengaged state of the third clutch
4th clutch: engaged/disengaged state of the fourth clutch
5th clutch: engaged/disengaged state of the fifth clutch
6th clutch: engaged/disengaged state of the sixth clutch
7th clutch: engaged/disengaged state of the seventh clutch
VM: state of internal combustion engine
EM: state of electric machine
O: clutch open; components which can be connected via the clutch rotate independently of one another; VM or EM is not operated
X: clutch closed; components connected by the clutch are connected together in a rotationally fixed manner; VM or EM is operated (that is to say, in the case of the electric machine, supplied with power)

Figure 2:
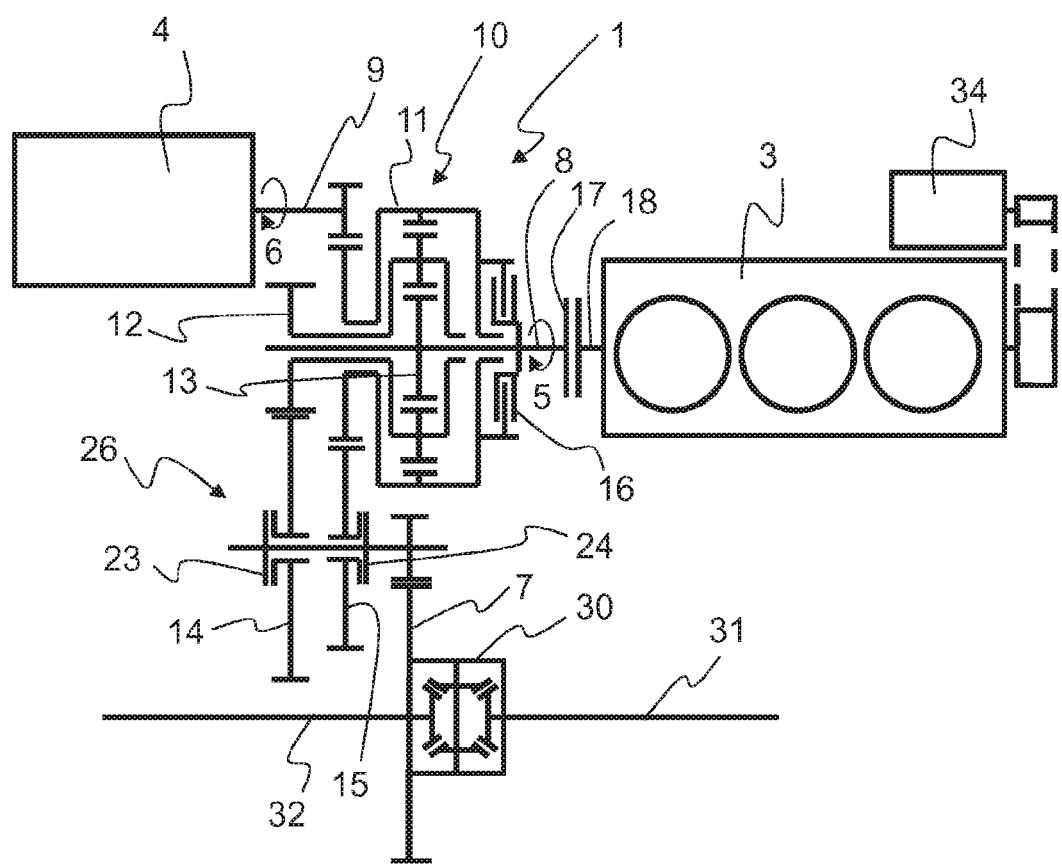
FIG. 2 illustrates a transmission assembly according to a second example.

FIG. 2 shows a transmission assembly 1 according to a second example. In contrast to the transmission assembly of FIG. 1, this transmission assembly 1 comprises a second transmission system 26, wherein this second transmission system 26 provides the two possible transmissions 14, 15. A drive torque (the first drive torque 5 and/or the second drive torque 6) can thus be transferred via the first planetary transmission 10 to the second transmission system 26 and via the second transmission system 26 to the drive shaft 7. The second transmission system 26 comprises a first transmission 14, which can be connected via a third clutch 23 to the drive shaft 7, and a second transmission 15, which can be connected via the fourth clutch 24 to the drive shaft 7. In the case of the first transmission 14, the drive torque is transferred to the drive shaft 7 starting from a component of the first planetary transmission 10 (here from the first planetary carrier 12) via the second transmission system 26. In the case of the second transmission 15, the drive torque is transferred to the drive shaft 7 starting from another component of the first planetary transmission 10 (here from the first ring gear 11) via the second transmission system 26.

In contrast to the first example, a CVTM operation is here possible only via the first transmission 14; that is to say only CVTM1 operation.

The engaged/disengaged states of the individual clutches 16, 17, 23, 24 for the respective operating method are indicated hereinbelow for this second example of the transmission assembly 1. Reference is made to the above notations.

| Operating method | | 1st clutch | 2nd clutch | 3rd clutch | 4th clutch | VM | EM |
|---|---|---|---|---|---|---|---|
| CVTM1 | | ○ | X | X | ○ | X | X |
| 1st gear | DM | X | X | X | ○ | X | X |
| | EM | X | ○ | X | ○ | ○ | X |
| 2nd gear | DM | X | X | ○ | X | X | X |
| | EM | X | ○ | ○ | X | ○ | X |
| Tow-start | | | | Possible in both gears | | | |
| eStart | | X | X | ○ | ○ | ○ | X |

Figure 3:
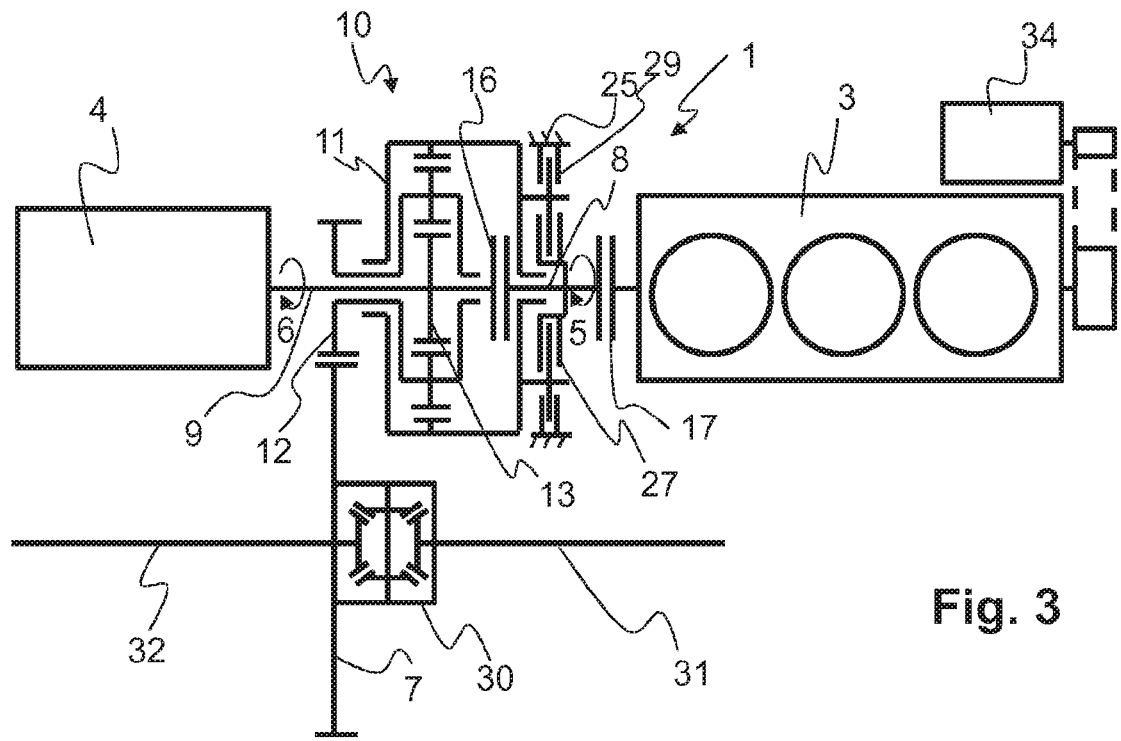
FIG. 3 illustrates a transmission assembly according to a third example.

FIG. 3 shows a transmission assembly 1 according to a third example. In contrast to the first and second examples and in accordance with the above-described second example, the second transmission input shaft 9 is connected in a rotationally fixed manner, here in a permanently rotationally fixed manner, to the first planetary transmission 10 via the first sun gear 13 by a constant transmission. In a permanently rotationally fixed manner here means that a clutch is not provided between the second transmission input shaft 9 and the first sun gear 13 (see FIG. 4: the first clutch 16 is there provided between the second transmission input shaft 9 and the first sun gear 13). The first clutch 16 connects the first transmission input shaft 8 to the first planetary transmission 10 via the first sun gear 13, so that the first transmission input shaft 8 can be connected to the second transmission input shaft 9 in a rotationally fixed but here engageable/disengageable manner There is further provided a second clutch 17, via which the first transmission input shaft 8 is connected in an engageable/disengageable manner to a crankshaft 18 of the internal combustion engine 3.

The transmission assembly 1 thereby comprises the first planetary transmission 10 as the only planetary transmission (and as the only transmission system). The transmission assembly 1 further comprises a first clutch 16 and a fifth clutch 27, wherein the first clutch 16 connects the first transmission input shaft 8 to the second transmission input shaft 9 and additionally the first transmission input shaft 8 to the first sun gear 13 in an engageable/disengageable manner via a constant transmission. The fifth clutch 27 connects the first transmission input shaft 8 to the first ring gear 11 via a constant transmission.

The transmission assembly 1 additionally comprises a seventh clutch 29, wherein the seventh clutch 29 connects the first ring gear 11 to a housing 25 of the transmission assembly 1 in an engageable/disengageable manner.

The drive shaft 7 is connected to the first planetary transmission 10 via the first planetary carrier 12.

In contrast to the first example, CVTM operation is possible here only via the first transmission 14; that is to say only CVTM1 operation (cf. second example). Transfer of the drive torques 5, 6 to the drive shaft 7 is here possible via two transmissions 14, 15 (first gear, second gear) via the first planetary transmission 10. It is thereby possible, despite the simple construction (only a first planetary transmission 10 is required), to achieve a large number of the above-mentioned operating methods. The internal combustion engine 3 can already be connected in on starting in 1st gear. The electric machine 4 can thus have a smaller construction form.

The engaged/disengaged states of the individual clutches (first clutch 16, second clutch 17, fifth clutch 27, seventh clutch 29) for the respective operating method are indicated hereinbelow for this third example of the transmission assembly 1. Reference is made to the above notations and to the description of the individual operating methods.

| Operating method | | 1st clutch | 2nd clutch | 5th clutch | 7th clutch | VM | EM |
|---|---|---|---|---|---|---|---|
| CVTM1 | | ○ | X | X | ○ | X | X |
| 1st gear | DM | X | X | ○ | X | X | X |
| | EM | ○ | ○ | ○ | X | ○ | X |
| 2nd gear | DM | X | X | X | ○ | X | X |
| | EM | X | ○ | X | ○ | ○ | X |
| Tow-start | | X | X | ○ | X | ○ | X |
| eStart | | X | X | ○ | ○ | ○ | X |

Figure 4:
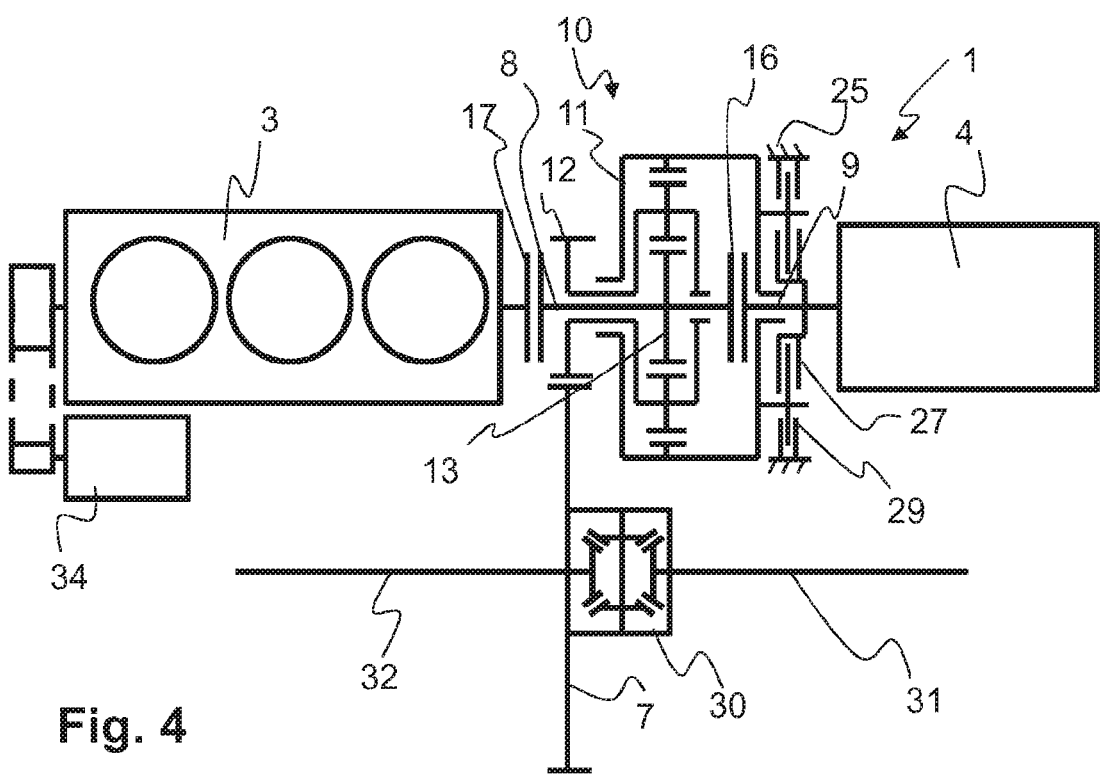
FIG. 4 illustrates a transmission assembly according to a fourth example.

FIG. 4 shows a transmission assembly 1 according to a fourth example. In contrast to the third example, the electric machine 4 and the internal combustion engine 3 together with the second clutch 17 are arranged transposed relative to the first planetary transmission 10.

Here too, the transmission assembly 1 comprises a first clutch 16 and a fifth clutch 27, wherein the first clutch 16 connects the first transmission input shaft 8 to the second transmission input shaft 9 and additionally the second input shaft 9 to the first sun gear 13 in an engageable/disengageable manner via a constant transmission. The first clutch 16 is thus here provided between the second transmission input shaft 9 and the first sun gear 13. The fifth clutch 27 connects the second transmission input shaft 9 to the first ring gear 11 via a constant transmission.

The engaged/disengaged states of the individual clutches (first clutch 16, second clutch 17, fifth clutch 27, seventh clutch 29) for the respective operating method are indicated hereinbelow for this fourth example of the transmission assembly 1. Reference is made to the above notations and to the description of the individual operating methods.

| Operating method | | 1st clutch | 2nd clutch | 5th clutch | 7th clutch | VM | EM |
|---|---|---|---|---|---|---|---|
| CVTM1 | | ○ | X | X | ○ | X | X |
| 1st gear | DM | X | X | ○ | X | X | X |
| | EM | X | ○ | ○ | X | ○ | X |
| 2nd gear | DM | X | X | X | ○ | X | X |
| | EM | X | ○ | X | ○ | ○ | X |
| Tow-start | | X | X | ○ | X | ○ | X |
| eStart | | X | X | ○ | ○ | ○ | X |

Figure 5:
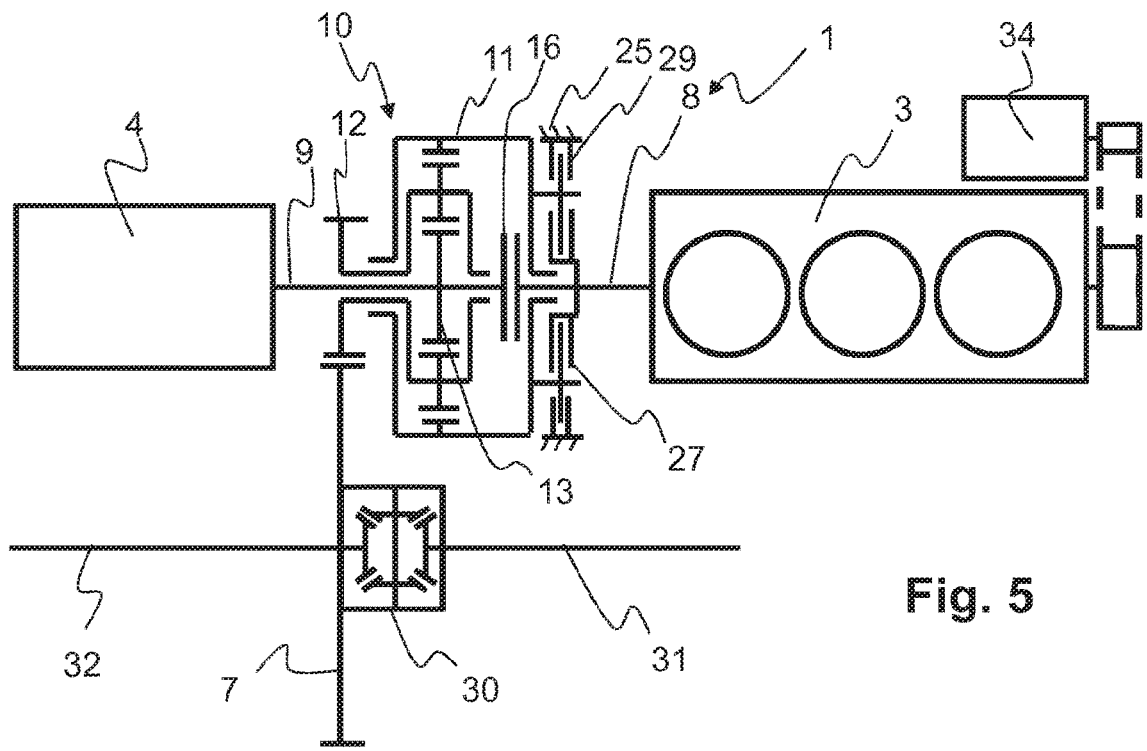
FIG. 5 illustrates a transmission assembly according to a fifth example.

FIG. 5 shows a transmission assembly 1 according to a fifth example. In contrast to the third example, a second clutch 17 is not provided here between the first transmission input shaft 8 and the crankshaft 18. The first transmission input shaft 8 and the crankshaft 18 are thus connected together in a permanently rotationally fixed manner Otherwise, reference is made to the comments relating to FIG. 3.

Here, a purely electromotive operating method (EM) is not possible in 2nd gear. In the case of the higher speeds that are present here (usually more than 50 kilometers per hour), driving can take place, however, in the direct drive operating method (DM), in which primarily the internal combustion engine 3 provides the required drive torque.

The engaged/disengaged states of the individual clutches (first clutch 16, fifth clutch 27, seventh clutch 29) for the respective operating method are indicated hereinbelow for this fifth example of the transmission assembly 1. Reference is made to the above notations and to the description of the individual operating methods.

| Operating method | | 1st clutch | 5th clutch | 7th clutch | VM | EM |
|---|---|---|---|---|---|---|
| CVTM1 | | ○ | X | ○ | X | X |
| 1st gear | DM | X | ○ | X | X | X |
| | EM | ○ | ○ | X | ○ | X |
| 2nd gear | DM | X | X | ○ | X | X |
| | EM | | | Not possible | | |
| Tow-start | | | | Not possible | | |
| eStart | | X | ○ | ○ | ○ | X |

Figure 6:
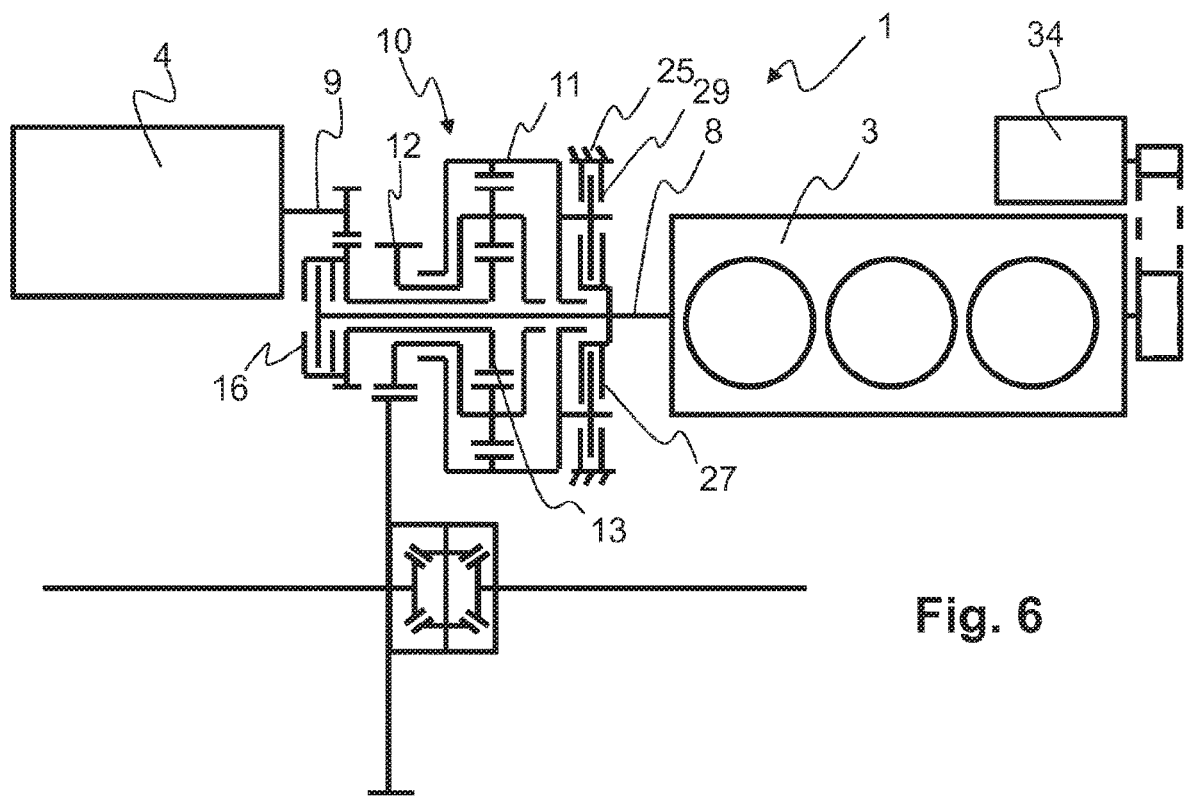
FIG. 6 illustrates a transmission assembly according to a sixth example.

FIG. 6 shows a transmission assembly 1 according to a sixth example. In contrast to the fifth example, the first clutch 16 is here arranged outside the first ring gear 11. The second transmission input shaft 9 is connected to the first sun gear 13 via a constant transmission. The first transmission input shaft 8 extends through the first planetary transmission 10 and through the first sun gear 13 and is connected to the first sun gear 13 via the first clutch 16. Otherwise, reference is made to the comments relating to FIG. 5.

The engaged/disengaged states of the sixth example of the transmission assembly 1 correspond to the engaged/disengaged states of the fifth example.

Figure 7:
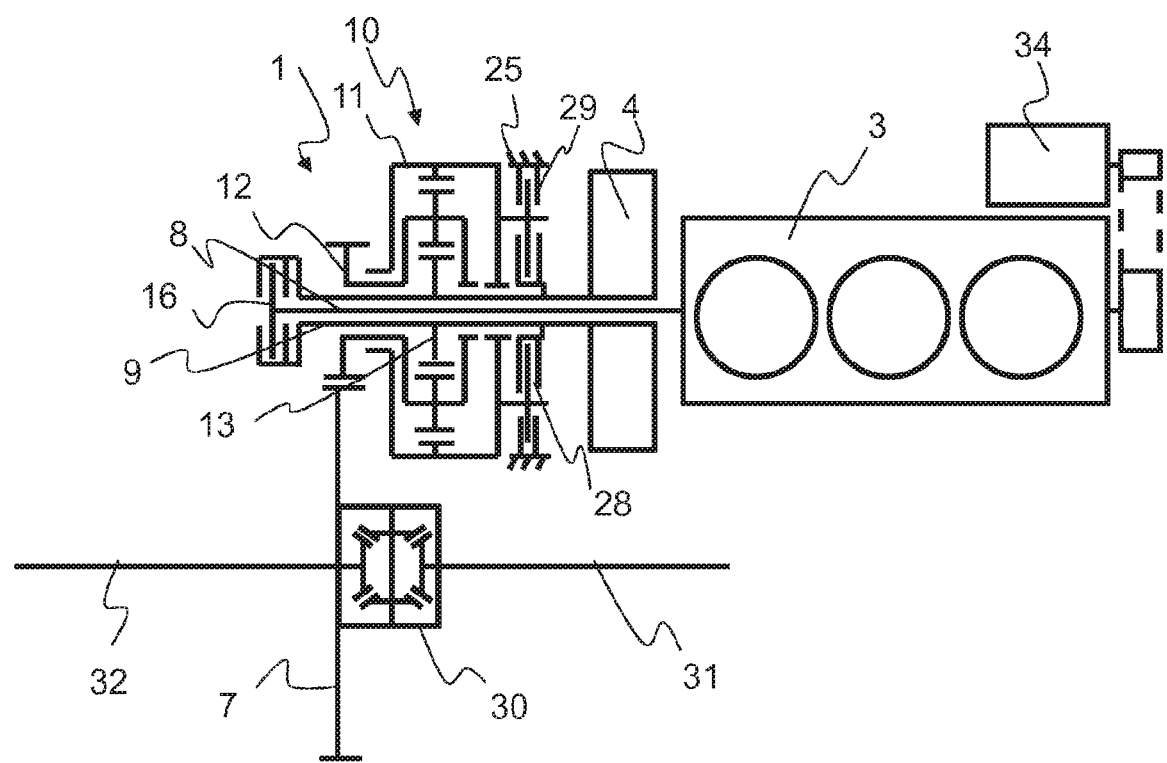
FIG. 7 illustrates a transmission assembly according to a seventh example.

FIG. 7 shows a transmission assembly 1 according to a seventh example. The electric machine 4 and the internal combustion engine 3 are here arranged on the same side of the first planetary transmission 10. The first transmission input shaft 8 extends through the electric machine 4 and through the second transmission input shaft 9. The first transmission input shaft 8 and the second input transmission shaft 9 can be connected together in a rotationally fixed manner via a first clutch 16.

The transmission assembly 1 additionally comprises a seventh clutch 29, wherein the seventh clutch 29 connects the first ring gear 11 to a housing 25 of the transmission assembly 1 in an engageable/disengageable manner.

The transmission assembly 1 (which can include only one transmission system, namely the first planetary transmission 10) comprises the first clutch 16 and also a sixth clutch 28, wherein the first clutch 16 connects the first transmission input shaft 8 to the second transmission input shaft 9 and additionally the first transmission input shaft 8 to the first sun gear 13 in an engageable/disengageable manner via a constant transmission, wherein the sixth clutch 28 connects the second transmission input shaft 9 to the first ring gear 11 via a constant transmission.

The CVTM1 and CVTM2 operating methods cannot be carried out here. However, as a result of the transferability of drive torques via a 1st and a 2nd gear, the internal combustion engine 3 can already be used for start up.

The engaged/disengaged states of the individual clutches (first clutch 16, sixth clutch 28, seventh clutch 29) for the respective operating method are indicated hereinbelow for this seventh example of the transmission assembly 1. Reference is made to the above notations and to the description of the individual operating methods.

| Operating method | | 1st clutch | 6th clutch | 7th clutch | VM | EM |
|---|---|---|---|---|---|---|
| 1st gear | DM | X | ○ | X | X | X |
| | EM | ○ | ○ | X | ○ | X |
| 2nd gear | DM | X | X | ○ | X | X |
| | EM | ○ | X | ○ | ○ | X |
| Tow-start | | | | Not possible | | |
| eStart | | X | ○ | ○ | ○ | X |

The examples presented here represent only examples s of the transmission assembly. In no case should the disclosure be limited by the exemplary examples shown. It is also possible to extract partial aspects of the facts described in the figures and combine them with other constituent parts and findings from the present description and/or figures.

LIST OF REFERENCE NUMERALS 1 transmission assembly
2 hybrid vehicle
3 internal combustion engine
4 electric machine
5 first drive torque
6 second drive torque
7 drive shaft
8 first transmission input shaft
9 second transmission input shaft
10 first planetary transmission
11 first ring gear
12 first planetary carrier
13 first sun gear
14 first transmission
15 second transmission
16 first clutch
17 second clutch
18 crankshaft
19 second planetary transmission
20 second ring gear
21 second planetary carrier
22 second sun gear
23 third clutch
24 fourth clutch
25 housing
26 second transmission system
27 fifth clutch 28 sixth clutch
29 seventh clutch
30 differential
31 first output shaft
32 second output shaft
33 axle
34 generator

The invention claimed is:

1. A transmission assembly for a hybrid vehicle having an internal combustion engine and an electric machine, wherein a first drive torque of the internal combustion engine and a second drive torque of the electric machine are transferable to a drive shaft of the hybrid vehicle via the transmission assembly, wherein the transmission assembly comprises:
   (1) a first transmission input shaft, via which the first drive torque of the internal combustion engine is introduced into the transmission assembly;
   (2) a second transmission input shaft, via which the second drive torque of the electric machine is introduced into the transmission assembly;
   (3) the drive shaft;
   (4) at least a first planetary transmission having at least a first ring gear, a first planetary carrier, and a first sun gear;
   (5) a first clutch;
   (6) a sixth clutch; and
   (7) a seventh clutch;
      wherein the first transmission input shaft is connected via the first planetary transmission to the second transmission input shaft and to the drive shaft;
      wherein the transmission assembly provides a plurality of operating modes including:
   a. driving the drive shaft solely via the second drive torque;
   b. driving the drive shaft via the first drive torque and the second drive torque, wherein the first transmission input shaft and the second transmission input shaft are connected together via a constant transmission mode;
   c. driving the drive shaft via the first drive torque or the second drive torque, wherein the first drive torque or the second drive torque is transferred via a first transmission mechanism and via a second transmission mechanism; and
      wherein the first planetary transmission is the only planetary transmission within the transmission assembly;
      wherein the first clutch connects the first transmission input shaft to the second transmission input shaft and additionally the first transmission input shaft to a first component of the first planetary transmission in an engageable manner and a disengageable manner via the constant transmission mode;
      wherein the sixth clutch connects the second transmission input shaft to a second component of the first planetary transmission via the constant transmission mode; and
      wherein the seventh clutch connects the second component of the first planetary transmission to a housing of the transmission assembly in an engageable manner and a disengageable manner.

2. The transmission assembly as claimed in claim 1, wherein the plurality of operating modes further includes:
   driving the drive shaft via the first drive torque and the second drive torque, wherein the first transmission input shaft and the second transmission input shaft are connected together via a variable transmission mode.

3. The transmission assembly as claimed in claim 1, wherein the plurality of operating modes further includes:
   driving the first transmission input shaft via the second transmission input shaft for starting the internal combustion engine.

4. The transmission assembly as claimed in claim 1, wherein the first clutch connects the second transmission input shaft to a component of the first planetary transmission in an engageable manner and a disengageable manner via the constant transmission mode.

5. The transmission assembly as claimed in claim 1, wherein the transmission assembly comprises a second clutch, wherein the second clutch is provided for connecting a crankshaft of the internal combustion engine to the first planetary transmission in an engageable manner and a disengageable manner via the constant transmission mode.

6. The transmission assembly as claimed in claim 1, further comprising a fifth clutch, wherein the fifth clutch connects the first transmission input shaft to another component of the first planetary transmission via the constant transmission mode.

7. The transmission assembly as claimed in claim 1, wherein the drive shaft is connected via the first planetary carrier to the first planetary transmission.

8. A transmission assembly for a hybrid vehicle having an internal combustion engine and an electric machine, wherein a first drive torque of the internal combustion engine and a second drive torque of the electric machine are transferable to a drive shaft of the hybrid vehicle via the transmission assembly, wherein the transmission assembly comprises:
   (1) a first transmission input shaft, via which the first drive torque of the internal combustion engine is introduced into the transmission assembly;
   (2) a second transmission input shaft, via which the second drive torque of the electric machine is introduced into the transmission assembly;
   (3) the drive shaft;
   (4) at least a first planetary transmission having at least a first ring gear, a first planetary carrier, and a first sun gear;
   (5) a second planetary transmission having at least a second ring gear, a second planetary carrier and a second sun gear, wherein the first planetary transmission is connected via the second planetary transmission to the drive shaft;
   (6) a third clutch, wherein the third clutch connects two components of the second planetary transmission together in an engageable manner and a disengageable manner to lock the second planetary transmission; and
   (7) a fourth clutch, wherein the fourth clutch connects one of the components of the second planetary transmission to a housing of the transmission assembly in an engageable manner and a disengageable manner;
      wherein the first transmission input shaft is connected via the first planetary transmission to the second transmission input shaft and to the drive shaft;
      wherein the transmission assembly provides a plurality of operating modes including:
   a. driving the drive shaft solely via the second drive torque;
   b. driving the drive shaft via the first drive torque and the second drive torque, wherein the first transmission input shaft and the second transmission input shaft are connected together via a constant transmission mode;
   c. driving the drive shaft via the first drive torque or the second drive torque, wherein the first drive torque or the second drive torque is transferred via a first transmission mechanism and via a second transmission mechanism.

\* \* \* \* \*

UNITED STATES PATENT AND TRADEMARK OFFICE
CERTIFICATE OF CORRECTION

| | | |
|---|---|---|
| PATENT NO. | : 11,780,315 B2 | Page 1 of 1 |
| APPLICATION NO. | : 16/624328 | |
| DATED | : October 10, 2023 | |
| INVENTOR(S) | : Theodor Gassmann | |

It is certified that error appears in the above-identified patent and that said Letters Patent is hereby corrected as shown below:

On the Title Page

In the Abstract:
Item (57), in Line 8, replace "torque 1 of the" with -- torque of the --.

Signed and Sealed this
Fourteenth Day of November, 2023

Katherine Kelly Vidal
*Director of the United States Patent and Trademark Office*